Oct. 6, 1931.   V. G. APPLE   1,826,297
METHOD OF MAKING ELECTRIC COILS
Filed May 24, 1930
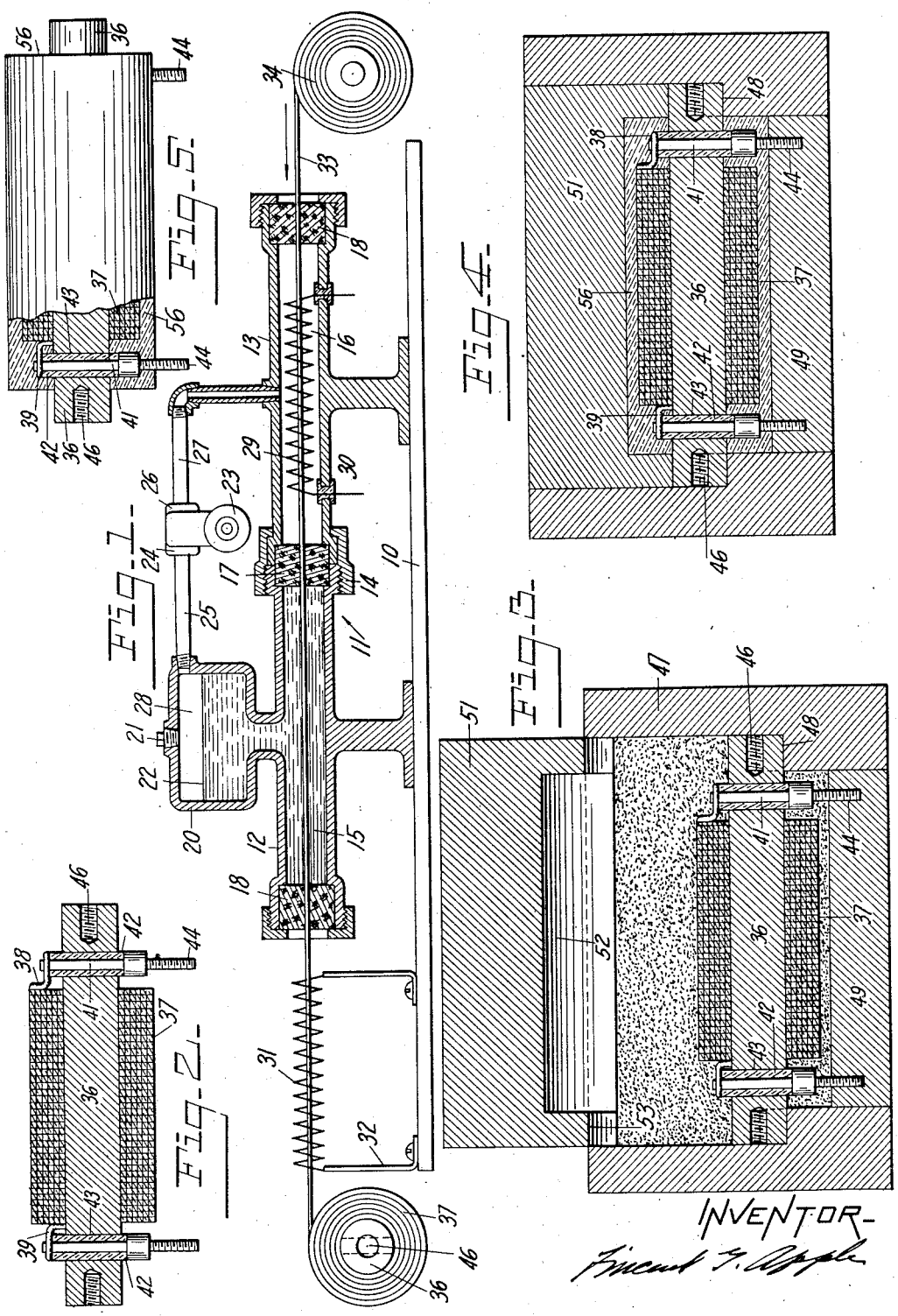
INVENTOR Patented Oct. 6, 1931

1,826,297

UNITED STATES PATENT OFFICE

VINCENT G. APPLE, OF DAYTON, OHIO

METHOD OF MAKING ELECTRIC COILS

Application filed May 24, 1930. Serial No. 455,296.

This invention relates to an improved method of making electric coils and has special reference to coils the turns of which are imbedded in and covered by a mass of insulation.

An object of the invention is to insure more and better insulation between the individual turns of coils than has been possible by methods heretofore employed.

A second object is to provide means and a procedure which will carry out the first object with minimum expenditure of labor and material.

Another object is to provide a process and apparatus whereby the more or less porous covering of magnet wire may be saturated and coated with an accurately determined layer of suitable insulating material in liquid form and partially dried before it is wound into coils, to the end that there will be no excess of the liquid present which may get on the spool or core upon which the coil is placed, or on other surfaces of the structure, or in openings therein, where insulation would be objectionable and where its removal would present almost insurmountable difficulties after it became solid.

Another object is to employ insulating material of such a nature, and to so apply it between the turns of the coils as will provide a structure wherein the winding is capable of withstanding great abuse and considerable compressive stress, to the end that a layer of plastic insulation may safely be pressure molded thereabout, without injury thereto when such a covering is deemed desirable.

That these and many other objects and meritorious features of the invention are attained by the procedure hereinafter outlined and described, will be readily apparent to one skilled in the art from a consideration of the following descripton when taken in conjunction with the drawings which illustrates an electrical coil made according to the principles involved in my invention.

In the drawings,

Fig. 1 shows apparatus for applying a coating of liquid insulation to a magnet wire which already has a covering of more or less porous insulation.

Fig. 2 is a longitudinal cross section through the coil shown in process of winding in Fig. 1.

Fig. 3 shows the coil Fig. 2 in a mold ready to have a jacket of plastic insulation molded about it.

Fig. 4 shows the mold Fig. 3 after the jacket has been molded.

Fig. 5 shows a complete coil.

Similar numerals refer to similar parts throughout the several views.

In the construction of wound electrical devices which are intended to withstand any considerable electrical pressure it is the usual practice to wind the spools, or cores as the case may be, with conductive wire having a covering of more or less porous insulation, usually a fibrous material such as cotton, silk, asbestos, etc. and subsequently to immerse the wound core in a liquid insulating material and then apply pressure to the container to force the liquid to enter the porous covering of the wires and other interstices of the winding.

An objection to this method of insulating coils by impregnation is that often, after a coil is wound, and before it is impregnated with the liquid insulation, there are turns of the wire within the coil which are pressed so closely together, one turn against another, that the fibrous covering is almost, and sometimes quite, cut through, leaving adjacent turns in electrical contact, the condition occurring most frequently of course in a winding such as is employed on an armature, where many of the turns cross, one over the other.

Obviously, a sufficiently high pressure may force a liquid insulation to the innermost turns of the wound coil, but there is no reason to believe that any amount of pressure on the container will force the liquid to enter and spread apart those turns which are already in too intimate contact.

But the foregoing objection met in conventional practice is completely overcome by my improved method which consists mainly of impregnating and coating my wire with an insulating compound and partly hardening it before winding it into a coil. In this way the several turns are held farther and more uniformly spaced apart by insulation than is possible when the coil is wound first and the insulation forced into it afterward. The insulation which surrounds the wire in my coil is made just hard enough before winding it to prevent its being forced out by the pressure of one turn on the other, yet not so hard but that the coating of one layer will fuse together with the coating of adjacent layers when the coil is afterward baked to completely harden it.

Another objection to the method of insulating wound devices by impregnation, is that in a great many cases the coils must be wound directly on the core, so that when afterward the coils are to be impregnated, the entire structure comprising the core, the coils and their terminals is necessarily immersed in the liquid insulation.

Now this would involve no great hardship in the case of a simple coil, but in a more complex structure, comprising a core, binding posts and other parts, the liquid in which the structure is immersed not only adheres to parts to which it is desirable that it should adhere, but it gets into tapped openings and into threaded studs and over surfaces where it is highly objectionable and difficult to remove, and while tools may be made to exclude the insulation from these parts while impregnation is being effected, there is afterward substantially as great difficulty in removing the surplus insulation from these tools as there would have been in removing it from the surfaces and holes of the wound element protected by them, for it is a well known fact that some of the best known liquid insulating materials have also the greatest adhesive properties.

Because they overcome the foregoing and many other objections to the conventional method of insulating coils, the hereinafter described procedure is considered of great value in the art.

The coating apparatus Fig. 1 has a base 10 upon which is mounted a tubular body 11, divided near its middle into two parts 12 and 13, the parts being held together by a threaded sleeve 14.

Body 11 is hollow, the space within being divided into two chambers 15 and 16 separated by a plug 17, which may be inserted and removed when the two parts 12 and 13 are separated by the removal of sleeve 14.

Plugs 18, held in place by screw caps 19, close the outer ends of chambers 15 and 16. Both plugs 18 as well as plug 17 have holes, extending longitudinally therethrough, of a diameter equal to that of the wire to be coated. These plugs are preferably made from a material of a more or less yielding nature so as to permit the passage of a knot or a splice without undue strain on the wire. Cork has been found to be satisfactory both as to yielding qualities and as to wear, although a soft rubber plug having a small longitudinally split metal bushing imbedded at its center is equally desirable.

A tank 20 extends from body part 12 and communicates with chamber 15. Upon removal of filler plug 21 the tank may be partly filled with liquid insulation 22 as shown. An air pump 23 has its discharge valve 24 connected by pipe 25 to tank 20 and its suction valve 26 connected by pipe 27 to chamber 16. The pump 23 is operated to create a partial vacuum in chamber 16 and pressure in the space 28 above the liquid 22 in tank 20.

A coil 29 of electrical resistance wire is suspended within, but does not touch chamber 16. The ends of coil 29 are brought out through insulating bushings 30 as shown. A second coil 31 is supported on metal brackets 32 extending from base 10. An electric current is made to flow through coils 29 and 31 when wire is being coated.

Magnet wire 33 comprising conductive wire covered with a thin layer of cotton or similar absorbent material is drawn from its spool 34 through one plug 18 into vacuum chamber 16 through coil 29 out of chamber 16 through plug 17 into the liquid insulation 22 in chamber 15 and out through the other plug 18 and coil 31.

When the wire 33 enters chamber 16, the partial vacuum, together with the heat generated by resistance coil 29, takes whatever moisture there may be from the porous cover, so that it enters chamber 15 dry and with the pores of the fibrous covering under partial vacuum, and inasmuch as liquid 22 is under pressure it more readily penetrates all of the pores of the fibrous covering.

As the wire emerges from chamber 15 through plug 18 the surplus liquid is stripped off and retained in the chamber and the coating is given a definite size, depending of course on the accuracy maintained in the opening through plug 18. As the wire passes through heating coils 31, the liquid insulation is partly dried before it is wound on the core 36. Core 36 may be rotated by any suitable means, preferably a means under accurate control as to speed, since it is important that the coating on the wire reach a definite degree of hardness before it is wound on the coil, and this is best accomplished by predetermining the speed at which the wire moves through the coating apparatus as compared with the length of the heating coil 31.

The method herein described for impregnating and coating a fibrous covered wire is shown and claimed in my copending application Serial No. 356,586, filed April 19th, 1929, and shown but not claimed in the divisional application Serial No. 430,864, filed February 24th, 1930, the present application being confined to a method of making a coil from wire so coated.

Fig. 2 shows the core 36 with the coil 37 wound in place. The beginning 38 and end 39 of the coil are connected to terminal studs 41 which are press fitted into insulation bushings 42 driven into openings 43 in core 36. Studs 41 are threaded at the ends 44 for terminal nuts, and tapped holes 46 extend into the ends of core for mounting screws.

The structure Fig. 2 is now converted into a complete operative device merely by baking it at a temperature which first fuses together into a single mass the layers of insulation on adjacent turns of the coil then by continued heating completely hardens the fused together mass. It will of course be understood that while the coatings are still soft enough to be fused together they are no longer soft enough to run and drip off, since the coatings have heretofore been partly baked by the coil 31 of the coating apparatus.

The device shown in Fig. 2 after it is thoroughly baked may be taken as complete for many purposes, but where it is to be subjected to conditions of service in which it would be affected by oil or moisture or unusual physical abuse it may be advantageous to mold a heavier jacket of plastic insulation to completely surround it.

Now a coil impregnated in the conventional manner will not readily resist the pressure incident to molding a jacket of plastic insulation around it because of the heavy pressure required in molding such a jacket. But a coil prepared as shown in and described relative to Fig. 2, that is, one having the turns all spaced apart one from the other by a considerably greater layer of hardened cementitious insulation than may be gotten between the turns by impregnation, will readily withstand the molding of certain kinds of thermo plastic compounds around them with no ill effect.

When such an impervious jacket extending around the coil is desirable the mold shown in Figs. 3 and 4 is provided. This mold comprises the body 47 adapted to support the ends of the core 36 at 48, the loose bottom 49, with openings to receive threaded ends 44 of studs 41, and the plunger 51 hollowed out at 52 somewhat larger than coil 37 and at 53 to fit the ends of core 36.

In operation the mold is heated, the device Fig. 2 placed therein and a proper quantity of loose thermo plastic molding compound 54 placed over the device and the plunger 51 slightly entered as shown in Fig. 3. When the compound absorbs sufficient heat from the mold to become mobile the plunger is forced downward into place as shown in Fig. 4 and held in this position until the jacket is completely hardened by the heat of the mold or by additional heat applied thereto if required.

Fig. 5 shows the completed device after removal from the mold Fig. 4, the jacket 56 of hard molded insulation completely surrounding the coil and its connection to the terminal studs 41, leaving exposed only the threaded ends 44 and the outer ends of the core 36.

Had the conventional process of impregnation of the coil been followed the insulation used would have gotten into tapped holes 46, into threads 44, over the exposed surfaces of the core 36, and while in a simple device such as is here shown for illustration there are not many openings or parts from which the insulation would have to be removed, in more complex structures, such as wound elements of dynamo electric machines and the like, where the windings are necessarily assembled with a considerable number of other parts before they may be impregnated, the removal of the surplus insulation from these parts after they are immersed in the insulation becomes a serious matter.

That a considerable economy is effected by my improved process is also apparent for, by coating the wire by my improved apparatus, then partly hardening it on the wire before it is wound into the coil, all of the insulation used enters the coil, and when afterward sufficient heat is applied to fuse the insulation coatings on adjacent wires into a single mass, the insulation is already so far hardened that it may no longer soften sufficiently to permit any part of it to drip off. This economy may be more readily perceived when my process is contrasted with the conventional method, which necessarily includes thinning the insulation to a highly fluid state to permit it to be forced into the innermost parts of the winding, then baking it over a long period to drive out the thinner, in which case a large part of the insulation is boiled out and lost when the baking heat is first applied to the coil.

The higher quality of my improved coil as compared with those of conventional make is obvious, for adjacent turns of my winding are held spaced apart by a layer of insulation substantially double that of the coating placed on the wire before it is wound, the layers separating adjacent wires being composed of the coatings of the two wires fused together and hardened.

Having this view of the invention, I claim:

1. A method of imbedding the turns of an electric coil in a mass of insulation, which consists of impregnating and coating the fibrous covering on the wire with insulating material in liquid form, partly hardening the coating, winding the wire into a coil, heating the coil to first unite the coatings on the several turns of the wire into a single mass, then further heating it to harden the mass.

2. A method of imbedding the turns of an electric coil in a mass of insulation, which consists of impregnating and coating the fibrous covering on the wire with insulating material in liquid form, applying heat to the wire to partly harden the coating, winding the wire into a coil, heating the coil to first unite the coatings on the several turns of the wire into a single mass, then further heating it to harden the mass.

3. A method of imbedding and surrounding an electric winding in and by a mass of insulation, which consists of impregnating and coating the fibrous covering on the wire with insulating material in liquid form, partly hardening the liquid coating, winding the wire into a coil, heating the coil to first unite the coatings of adjacent turns into a single mass, further heating it to harden the mass within the coil to make it rigid, then compressing another mass of plastic insulation about the rigid coil.

4. A method of imbedding and surrounding an electric winding in and by a mass of insulation which consists of impregnating and coating the fibrous covering on the wire with cementitious insulating material in liquid form, applying heat to the liquid coating on the wire to convert it into a yielding solid, winding the wire into a coil, applying heat to the coil to fuse the coatings of adjacent turns into a single mass, further heating the insulation mass within the coil to make it rigid, then compressing a layer of thermo plastic insulation about the rigid coil.

5. The method of making a coil from conducting wire having a porous covering, which consists of drawing the wire into and out of snug fitting openings in an otherwise closed receptacle containing liquid insulation, the wire passing through said insulation, applying pressure to the insulation within said receptacle as the wire passes through, applying heat to said wire after it comes from said receptacle to partly dry the insulation forced into said covering by said pressure, winding the wire into a coil, then baking the coil to finish drying said insulation to harden said coil.

6. The method of making a coil from conducting wire having a porous covering, which consists of impregnating and coating the covering of the wire with a liquid cementitious insulation, applying heat to the wire for a determined period of time to partly dry said insulation, winding the wire into a coil, then applying heat to the coil to unite the coating on the several turns of the coil and to harden the united mass.

7. The method of making a coil for electrical use, from conducting wire having a covering of porous insulation, which consists of saturating and coating the porous covering with liquid insulation, sizing the coating by drawing the wire through a snug fitting opening, drying the liquid coating until it becomes solid but still pliable, winding the wire into a coil while the coating is still pliable, then baking the coil to convert the pliable coating into a rigid mass.

8. The method of making a coil for electrical use, from conducting wire having a covering of porous insulation, which consists of forcing liquid insulation into the porous covering by pressure while the wire is uncoiled, winding the wire into a coil, then hardening the liquid insulation within the coil.

9. The method of makng a coil for electrical use, from conducting wire having a covering of porous insulation, which consists of exhausting the air from the porous covering while the wire is uncoiled, passing the wire through a body of liquid insulation while the air is exhausted from the covering, winding the wire into a coil, then hardening the liquid insulation within the coil.

10. The method of makng a coil for electrical use, from conducting wire having a covering of porous insulation, which consists of exhausting the air from the porous covering while the wire is uncoiled, passing the wire into a body of liquid insulation while the air is still exhausted from the covering applying pressure to the body of liquid insulation as the wire passes through, winding the wire into a coil, then hardening the liquid insulation within the coil.

11. The method of making a coil for electrical use, from conducting wire having a covering of porous insulation, which consists of exhausting the air from the porous covering while the wire is uncoiled, heating the wire while the air is exhausted from said covering, passing the wire through a body of liquid insulation while the air is exhausted from the covering and the wire is heated, winding the wire into a coil, then hardening the liquid insulation within the coil.

12. The method of making a coil for electrical use, from conducting wire having a covering of porous insulation, which consists of exhausting the air from the porous covering while the wire is uncoiled, heating the wire while the air is exhausted from said covering, passing the wire into a body of liquid insulation while the air is still exhausted from the covering and wire is still heated, applying pressure to the body of liquid insulation as the wire passes through, winding the wire into a coil, then hardening the liquid insulation within the coil.

In testimony whereof I affix my signature.

VINCENT G. APPLE.